Feb. 8, 1927. 1,617,013
H. A. DENMIRE
FABRIC CUTTING MACHINE
Filed Oct. 4, 1924   2 Sheets-Sheet 1
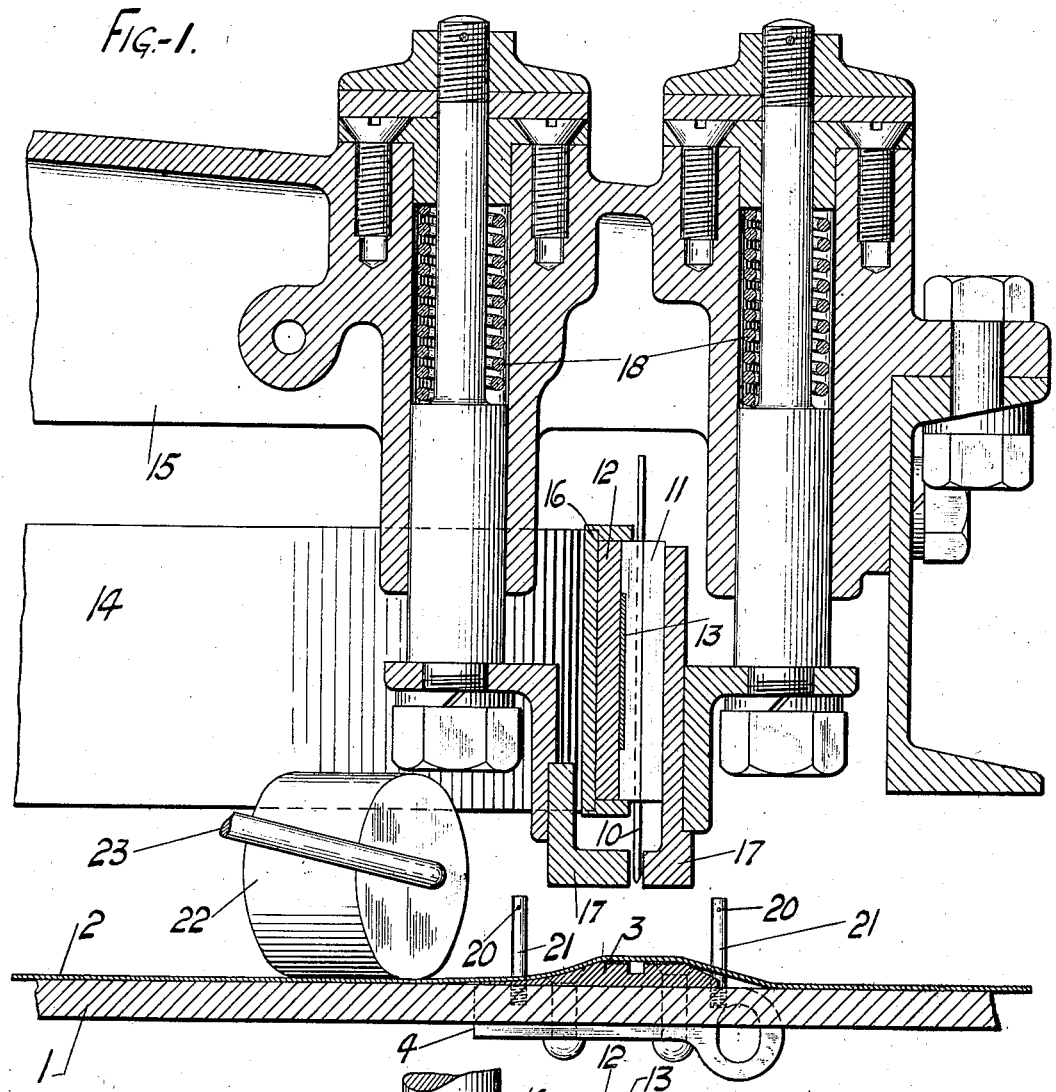
FIG.-1.
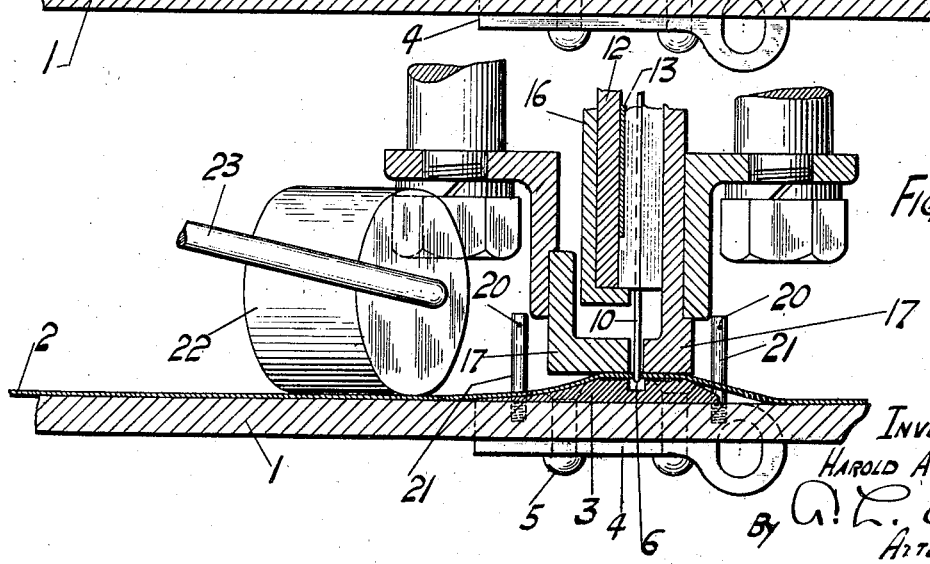
FIG.-2.
INVENTOR.
HAROLD A. DENMIRE.
ATTORNEY.

Feb. 8, 1927.

H. A. DENMIRE

FABRIC CUTTING MACHINE

Filed Oct. 4, 1924      2 Sheets-Sheet 2

1,617,013

INVENTOR.
HAROLD A. DENMIRE.
BY
ATTORNEY.

Patented Feb. 8, 1927.

1,617,013

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

FABRIC-CUTTING MACHINE.

Application filed October 4, 1924. Serial No. 741,538.

This invention relates to machines for cutting fabric into strips and may be useful in many arts, the particular object of the present invention being to construct a new and improved machine for cutting rubberized fabric such as used in the manufacture of pneumatic automobile tire casings.

More specifically, the object of the present invention is to improve upon cutting machines for this purpose such as heretofore invented by me and shown in prior applications filed by me, of which the mechanism shown in my prior application Serial No. 639,509, filed May 17, 1923, is an example.

The object of the present invention is to improve upon the feeding mechanism for the fabric, insuring an accurate and positive feed. Other objects will be apparent from the description and drawings which illustrate one embodiment of the invention in which:

Figure 1 is a vertical sectional view through the cutting machine showing the cutter in elevated position;

Figure 2 is a view showing the machine in the process of cutting;

Figure 3:
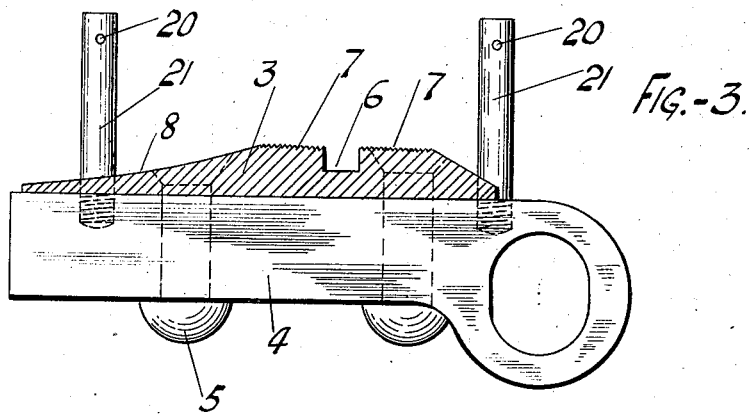
Figure 3 is an enlarged detail of the cutter bar.
Figure 4:
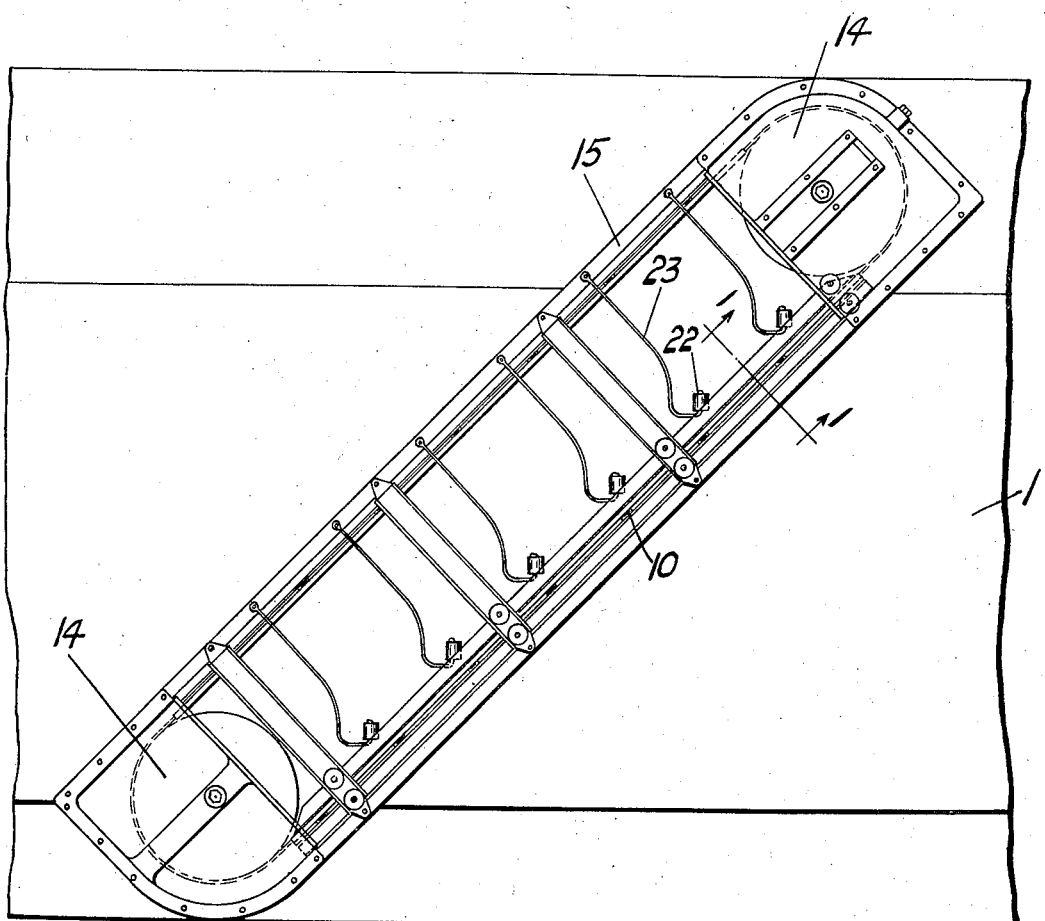
Figure 4 is a plan view.

In the machines for cutting fabric which form the subject matter of the previously filed applications and the present application, the fabric, which has been given a coating of rubber, is led onto an intermittently operated belt, and between the feeding movements of the belt, a cutting element is caused to descend and sever the fabric upon a cutter bar. The belt is advanced intermittently the required distance and the cutter element, which is in the form of a continuously driven belt having a series of knife blades, is carried in a framework which descends upon a bar extending over the belt and over which the fabric travels, leaving the belt temporarily for that purpose.

In the drawings, the intermittently operated belt is indicated by the numeral 1 and the fabric lying thereon is shown at 2. The machine is devised to cut the fabric at an angle, or on the bias, and the cutter bar and cutter element are arranged at the required angle. The cutter bar is a flat strip or plate of steel which is shown at 3 and which lies over the upper surface of the belt in the angular position indicated and is supported at the ends upon adjustable brackets 4 arranged at each side of the belt, the adjustment of the brackets permitting the bar to be raised or lowered slightly to accommodate a liner beneath the stock, if desired. Rivets 5 secure the cutter bar to the brackets. The upper surface of the cutter bar is provided with a longitudinal groove 6, in which the knives are received, and at either side of the groove is knurled or roughened, as at 7, so as to insure better gripping of the fabric. At either side the cutter bar is tapered or inclined so that the fabric will pass up from the belt and over the bar. As shown in the drawings, the forward tapering face of the cutter bar is formed with a concave surface, as shown at 8, so that as the fabric moves over the bar it is given a downward curvature, as shown in the drawings.

In the former application referred to above, the cutter bar was not provided with the concave surface described and as a result, there was created a tendency for the fabric to bend upwardly; thus, at times, destroying the accuracy of feed; but when the bar is shaped as here shown and described, any bending action of the fabric is downward or toward the bar, and by thus placing in the fabric an initial tendency to bend in a direction in which its bending action is positively limited by the bar itself, the fabric will pass over the bar without any additional deformation. In this manner an accurate feed is obtained and the oncoming fabric will push the cut strips off the bar and onto the belt.

As in the former application referred to above, the cutter element consists of a plurality of knife blades 10 which are clamped in holders 11 secured to a belt 12 which is reenforced by a steel band 13. The knife belt 12 is driven continuously by pulleys 14 which are carried in a movable frame 15, the details of which form no part of the present invention and will not be described except to state that the frame is raised and lowered by means not shown, while the fabric carrying belt is stationary. The knife belt is supported in a horizontal guideway 16 and at either side of the belt is arranged a clamping element 17 which is yieldingly supported, as at 18, so that as the frame carrying the cutter descends to its lowermost position to cause the knives to enter the fabric, the fabric is clamped upon the upper surface of the cutter bar.

At either side of the clamping device 17 are arranged parallel wires 20 which are carried in upright pins 21 secured in the upper face of the brackets 4, so that the wires will act as strippers should the fabric stick to the faces of the clamping element.

In order to assure that the fabric will remain in close contact with the belt, a plurality of rollers 22 ride upon the surface of the fabric being held in the ends of spring arms 23 which project forwardly from the cutter frame. By this arrangement the positive feeding of the fabric is maintained up to the cutting point so that the machine cuts accurately.

It will be observed that by means of very simple modifications of my prior inventions an absolutely accurate feed of the fabric is assured at all times, and while the present disclosure is of one embodiment of the invention only, changes and modifications may be made within the scope of the invention as set forth in the appended claims. Other devices may be used for imparting the downward bend to the fabric, as will be understood, my invention covering any suitable means for accomplishing the new result set forth.

What is claimed is:

1. In a machine for cutting fabric, a fabric carrying belt, a knife, and a cutter bar above the belt over which the fabric is moved, the fabric being concaved by the machine just prior to the time it reaches the knife.

2. In a machine for cutting fabric, a fabric carrying belt, a cutter bar above the belt over which the fabric is moved, and a concave surface in the forward face of the cutter bar.

3. In a machine for cutting fabric, a fabric carrying belt, a cutter bar extending above the belt and over which the fabric is moved, the upper surface of the cutter bar having a groove, a cutting element adapted to enter the groove, and an inclined surface leading from the belt to the groove, the inclined surface being concaved inwardly so as to impart a bend to the fabric as it passes over the cutter bar.

4. In a machine for cutting fabric, a fabric carrying belt, a cutter bar extending over the belt and over which the fabric is moved, and a cutting element adapted to cooperate with the bar, the organization imparting a bend in the fabric as it passes over the cutter bar.

5. In a machine for cutting fabric, a fabric carrying belt, means to elevate the fabric from the belt, a cutting element to sever the fabric while it is elevated, and means to impart a curvature to the fabric as it is elevated to cutting position.

6. In a machine for cutting fabric, a fabric carrying belt, a cutter bar extending over the belt and over which the fabric passes, a cutter element cooperating with the bar to sever the fabric, rollers resting upon the surface of the fabric before it reaches the bar, and a concave surface in the forward side of the bar.

7. In a machine for cutting fabric, a fabric carrying belt, a cutter bar extending over the belt and over which the fabric passes, a cutter element cooperating with the bar to sever the fabric, clamping members at each side of the cutter element, and stripping devices adjacent the clamping members.

8. In a machine for cutting fabric, a fabric carrying belt, brackets at the sides of the belt, a cutter bar supported upon the brackets and extending over the belt, a cutting element cooperating with the bar, and stripping devices also carried upon the brackets at either side of the cutting element.

HAROLD A. DENMIRE.